US010496288B1

(12) United States Patent
Morley

(10) Patent No.: US 10,496,288 B1
(45) Date of Patent: Dec. 3, 2019

(54) MECHANISM FOR DISTRIBUTING MEMORY WEAR IN A MULTI-TENANT DATABASE

(71) Applicant: Amazon Technologies, Inc., Seattle, WA (US)

(72) Inventor: Adam Douglas Morley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/560,855

(22) Filed: Dec. 4, 2014

(51) Int. Cl.
*G06F 12/00* (2006.01)
*G06F 3/06* (2006.01)

(52) U.S. Cl.
CPC .......... *G06F 3/0616* (2013.01); *G06F 3/0647* (2013.01); *G06F 3/0688* (2013.01)

(58) Field of Classification Search
USPC ........................................................ 711/103
See application file for complete search history.

(56) References Cited

U.S. PATENT DOCUMENTS

| | | | | | |
|---|---|---|---|---|---|
| 5,341,339 | A | * | 8/1994 | Wells | G06F 3/0601 |
| | | | | | 365/185.09 |
| 5,485,595 | A | * | 1/1996 | Assar | G06F 3/0601 |
| | | | | | 365/185.11 |
| 5,912,848 | A | * | 6/1999 | Bothwell | G06F 12/0246 |
| | | | | | 365/185.29 |
| 6,456,528 | B1 | * | 9/2002 | Chen | G11C 11/56 |
| | | | | | 365/185.03 |
| 8,504,556 | B1 | * | 8/2013 | Rice | G06F 17/3056 |
| | | | | | 707/713 |
| 2007/0266200 | A1 | * | 11/2007 | Gorobets | G06F 11/008 |
| | | | | | 711/103 |
| 2007/0288247 | A1 | | 12/2007 | Mackay | |
| 2009/0043831 | A1 | * | 2/2009 | Antonopoulos | G06F 3/0614 |
| 2010/0250700 | A1 | * | 9/2010 | O'Brien | G06F 3/0611 |
| | | | | | 709/217 |
| 2011/0238903 | A1 | | 9/2011 | Ban | |
| 2012/0240124 | A1 | | 9/2012 | Lipton et al. | |
| 2012/0304262 | A1 | | 11/2012 | Cucco et al. | |
| 2014/0059287 | A1 | * | 2/2014 | Bains | G11C 11/40615 |
| | | | | | 711/106 |
| 2014/0089560 | A1 | | 3/2014 | Sunkavalli et al. | |

(Continued)

OTHER PUBLICATIONS

Jedrak, "NAND Flash memory in embedded systems," design-reuse.com, Jun. 13, 2013, 8 pages.

(Continued)

*Primary Examiner* — Tuan V Thai
(74) *Attorney, Agent, or Firm* — Davis Wright Tremaine LLP

(57) ABSTRACT

A system may maintain a plurality of datasets within a fleet of memories subject to degraded operations caused by state transitions. A dataset maintained on one of the memories may be relocated to another memory. The dataset may be selected based on recorded observations that may be converted into a metric indicative of state transitions associated with maintaining a dataset. A dataset may be selected for relocation based on being associated with a high number of state transitions. The dataset may be relocated to a memory currently having a long operational lifetime relative to other memories in the fleet.

18 Claims, 6 Drawing Sheets

(56) References Cited

U.S. PATENT DOCUMENTS

2015/0205525 A1* 7/2015 Chiu ................. G06F 3/061
　　　　　　　　　　　　　　　　　　　　　　711/162
2015/0254560 A1　9/2015 Laredo et al.

OTHER PUBLICATIONS

Sharon et al., "Data Shaping for Improving Endurance and Reliability in Sub-20nm NAND," Flash Memory Summit, Aug. 4, 2014, 24 pages.

* cited by examiner

US 10,496,288 B1

MECHANISM FOR DISTRIBUTING MEMORY WEAR IN A MULTI-TENANT DATABASE

BACKGROUND

Solid-state drives may have a variety of benefits, such as speed and reliability that may be improved over conventional mechanical disk drives. However, the operational lifetime of a solid-state drive may be limited by memory wear, in which repeated reprogramming of the contents of memory causes the operation of the device to be degraded over time. Although solid-state drives may include memory controllers that manage the effects of memory wear, such controllers operate at the level of the drive and are not well-adapted for use in a hosted services environment.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
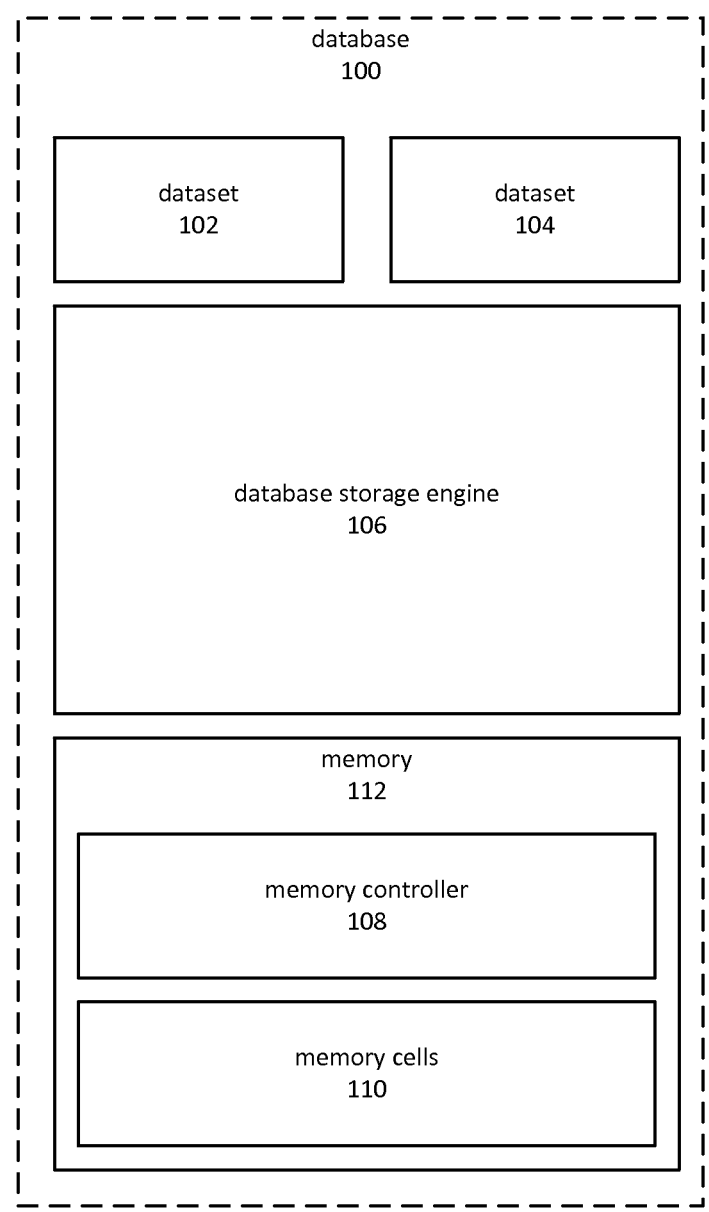
FIG. 1 is a block diagram depicting a multi-tenant database system that includes a memory device that may be subject to degraded operation upon state transitions in its memory cells.

Embodiments of the present disclosure may be employed in conjunction with the maintenance of a plurality of datasets on a plurality of memories, such as solid-state drives, that are subject to degraded performance caused by state transitions of memory cells contained in the memory. Embodiments may be employed in a hosted services environment in which fleets of solid-state drives or similar devices are used to store the data maintained by the system. Embodiments may be utilized to improve and/or manage the operational lifetimes of such devices in a hosted services environment.

Various types of memories, such as solid-state drives and flash drives, may be subject to degraded operation caused by state transitions in the memory cells of such devices. These devices may include various types of non-volatile memory, such as those with memory cells based on negated-and ("NAND") or negated-or ("NOR") techniques. Various other types of erasable-programmable memory cells may also possess the characteristic of operation that is degraded due to erase-write cycles or other state transitions. Memory devices such as solid-state devices may generally be referred to as being erasable-programmable memories, although the term "memory" as described herein is not limited to devices that undergo distinct erase cycles. Other examples of non-volatile memories include resistive memories and phase change memories. The term "memory" may include other types of storage. In addition, state transitions may include read operations that, while not changing the contents of the memory, nevertheless affect the state of the memory by causing wear. In some cases, read disturbance phenomena may require rewrites, which in turn may cause additional wear. It may be the case that, for some types of memory, read operations involving certain bit states may cause greater wear than read operations involving the opposite bit state. Accordingly, a read operation involving a first bit pattern might cause more wear than a read operation involving a second bit pattern.

Devices such as the foregoing may possess various limitations regarding the number of state transitions, such as program-erase cycles, read accesses, write accesses, and so forth, that a memory cell may be subject to before its operation is degraded. The degraded operation may involve a memory cell to fail or otherwise have degraded operation after some number of repeated program-erase cycles. A typically memory device, such as a solid-state drive, may contain large numbers of such cells. A memory controller for a solid-state drive may manage disabled or poorly performing cells. Over time, the operation of the solid-state drive may be noticeably affected as increasing numbers of its memory cells begin to fail or to perform poorly.

In some such devices, a subset of possible state transitions may result in degraded operation, while the remaining subset may not cause degraded operation. For example, it may be the case in some devices that erase operations will cause the operation of the device to be degraded, while writes do not. Depending on the data being written, certain write operations may have a greater impact than others. For example, in some devices erasing the memory may correspond to setting a memory cell to contain the value zero, and doing so may cause degraded operation of the memory cell. Writing a value of one to the same cell, on the other hand, may not affect the operation of the memory cell. Accordingly, the effect of a data write on a memory may depend on factors such as the distribution of ones and zeros in the data to be written, and on the distribution of ones and zeros in the memory on which the data will be stored. Additional factors may also influence the effect, such as write amplification and similar effects.

Embodiments may maintain a plurality of datasets on a plurality of memories subject to degraded performance caused by state transitions. Although memory controllers may in some cases provide management of poorly operating memory cells, the operation of such controllers may typically be unaware of the operation of applications that utilize the storage provided by the device, generally through various operating system calls and other layers of indirection. Aspects of the present disclosure may be employed to manage degraded operation of these types of memories when a plurality of such devices is employed in conjunction with the maintenance of a plurality of datasets on the devices. One non-limiting example involves a distributed database system maintaining a plurality of datasets, as a service, on behalf of various customers. This type of distributed database may be referred to as a multi-tenant database. Multi-tenant databases may employ aspects of the present disclosure to manage the operational lifetime of memory devices associated with the service.

FIG. 1 is a block diagram depicting a multi-tenant database system that includes a memory device that may be subject to degraded operation upon state transitions in its memory cells. It will be appreciated that FIG. 1 is intended to be illustrative of various aspects of the present disclosure as they apply to the interaction between such a memory device, or devices, and a database system. FIG. 1 should not be construed as limiting the scope of the present disclosure to a particular form of database. In particular, aspects of the present disclosure may be employed in conjunction with a variety of databases and similar applications for managing data in various computing systems. This may include relational, object-oriented, no structured query language ("NoSQL") databases, and so on. Both distributed and non-distributed database systems may be employed. Any of these various systems for managing data, as well as various additional types not explicitly described, may utilize the techniques described herein to improve interaction with memory devices that are subject to degraded operation caused by state transitions.

In FIG. 1, database 100 may comprise various subcomponents including database storage engine 106 coupled to memory 112. The memory 112 may be subject to degraded operation caused by state transitions in memory cells 110. A memory controller 108 may perform various operations to store and retrieve data. Storing or retrieving data may be referred to as accessing the data. Operations performed by memory controller 108 to store data may comprise erasing and rewriting blocks of memory. As described herein, certain of these erase and write operations may cause operation of the memory cells 110, and accordingly of memory 112, to be degraded. Memory controller 108 may perform various operations to minimize performance degradation. In various cases, memory controller 108 may provide various statistical information indicating a rate at which the operation of memory cells 110 are being degraded by state transitions.

A database 100 may house various datasets, such as the depicted datasets 102 and 104. A dataset, such as datasets 102 or 104, may refer to a collection of data owned by, belonging to, or corresponding to a common entity, such as a customer of a hosted database service. A hosted database service may provide computing services for the storage, retrieval, and management of data, and may be accessible to a customer through a network, one example of which is the Internet. A dataset, such as datasets 102 or 104, may also be owned by, belong to, or correspond to other entities, such as an executable computer process. In addition, a dataset may also include other units or groupings of data, such as database tables and so on. A dataset, therefore, may include one or more collections of data, including rows, tables, object graphs, n-dimensional cubes, and so on. In some cases, a dataset may refer to data sharing common schema definition, common semantic meaning, and/or common lexicography.

A database storage engine 106 may maintain datasets 102 and 104 by storing records indicative of the datasets in memory 112, or more specifically in memory cells 110. For simplicity, datasets 102 and 104 may be said to be maintained by database storage engine 106 in memory 112.

Maintaining a dataset, such as dataset 102, on memory 112 may comprise performing various storage and retrieval operations. Database storage engine 106 may interact, directly or indirectly, with memory 112 and memory controller 108 to store or retrieve data from memory cells 110. Accessing data by storing or retrieving it from memory 112 may impact the operation of memory 112 due to the state transitions of memory cells 110.

Embodiments may utilize the operation of database storage engine 106 to reduce the impact of maintaining datasets 102 and 104 on the rate at which the operation of memory 112 is degraded by state transitions of memory cells 110.

Embodiments may utilize the operation of database storage engine 106 to collect information indicative of state transitions of memory cells 110 that may be caused in the course of maintaining datasets 102 and 104 on memory 112. Database storage engine 106 may collect information pertaining to write operations issued in the course of maintaining a specific dataset, such as dataset 102. Storage engine 106 may form a count indicative of a number of write operations issued, for example by incrementing a counter each time a write operation occurs, or by using various approximation methods to estimate the number of write operations. This information may be collected independently of information pertaining to other datasets, such as dataset 104. The information may include information such as a count of write operations performed, a count of write operations corresponding to a specific pattern (such as all zeros or all ones), measures of entropy in the written data, a count of state transitions required to store the data, the locality of the data written, whether the writes occur continuously or in a burst pattern, and so on. This information may be indicative of the state transitions required to maintain the corresponding dataset.

Information about the operation of a system may be collected and formed into metrics. A metric may refer to a value that is indicative of some aspect of the operation of the system. Metrics may, in some cases, be formed from raw data with little or no transformation of the data. In other cases, metrics may refer to values derived through the application of various formulas, algorithms, conversions, counting operations, and so forth. For example, raw data might be converted to represent the same information in a different unit of measurement. In some cases, the metric might be normalized, for example by converting a count of transactions performed over several hours to a measure of transactions performed per second. It will be appreciated that these examples are intended to be illustrative, and should not be viewed as limiting the scope of the present disclosure.

Figure 2:
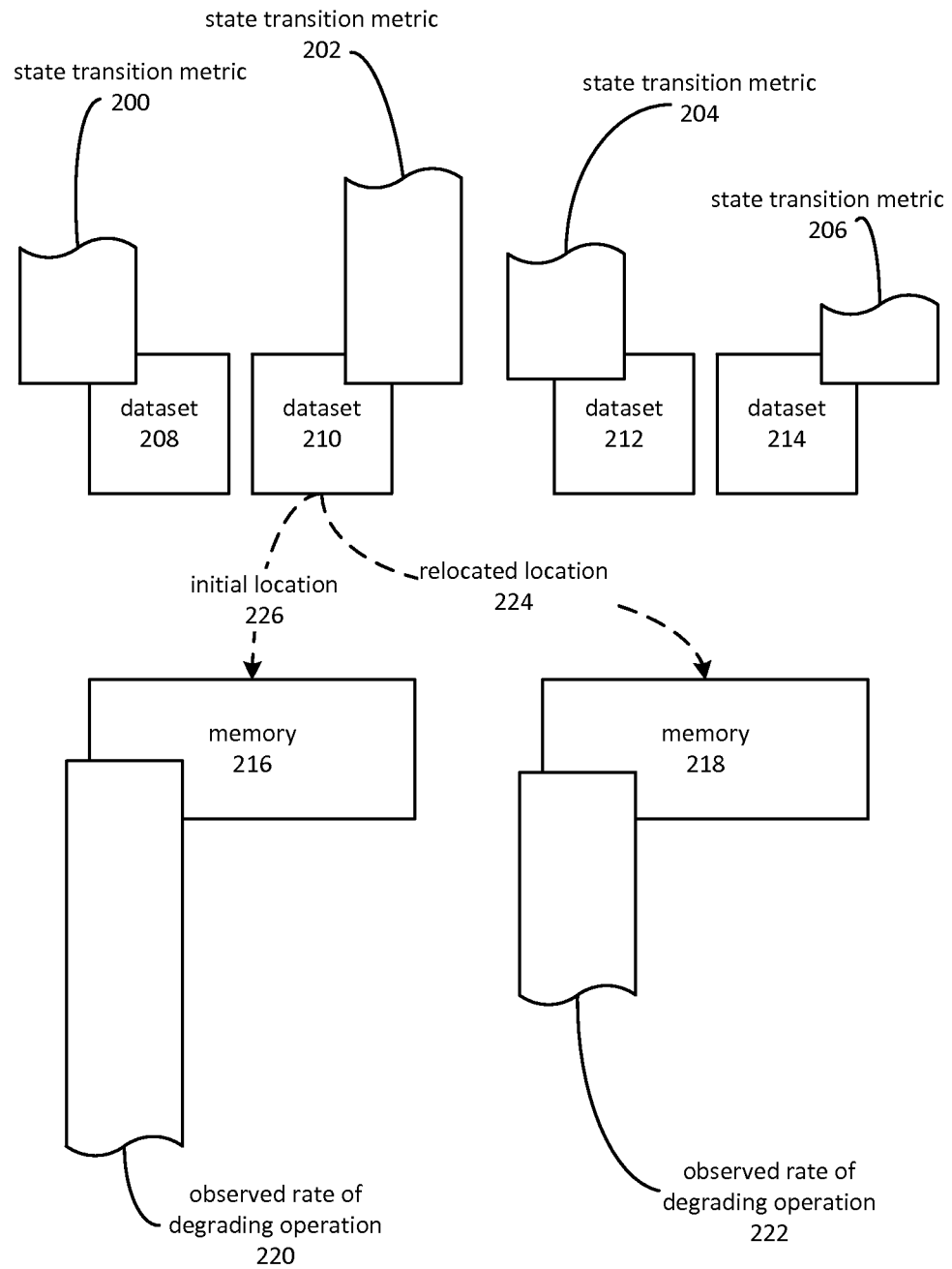
FIG. 2 is a block diagram depicting an embodiment of a process for managing a fleet of memory devices used to maintain a plurality of datasets.

Embodiments may utilize the per-dataset metrics to assist in the management of a fleet of memory devices, each subject to degraded operation caused by state transitions of their respective memory cells. FIG. 2 is a block diagram depicting an embodiment of a process for managing a fleet of memory devices used to maintain a plurality of datasets. For illustrative purposes, FIG. 2 depicts metrics and other information pertaining to objects such as datasets 208-214 and memories 216 and 218. For example, state transition metric 200 corresponds to dataset 208, observed rate of degrading operation 220 pertains to memory 216, and so on. The observed rate of degrading operations 220 and 222 may be collected as metrics and stored.

Metrics pertaining to a dataset may be collected by a storage engine or other module or process. For example, a database storage engine may monitor write requests issued to memory 216 and collect various metrics, such as the depicted state transition metric 200, that pertain to the maintenance of dataset 208. Similarly, state transition metric 202 may be collected for dataset 210, state transition metric 204 may be collected for dataset 212, and state transition metric 206 may be collected for dataset 214. State transition metrics 200-204 may include any of the various types of metrics and other data, as described herein. For example, state transition metric 202 might be based on recorded observations of requests to access data issued to memory 216.

The arrow marked initial location 226 is provided for illustrative purposes to indicate that dataset 210 might initially be located on memory 216. Embodiments may determine to relocate dataset 210 to memory 218, as indicated by the arrow marked relocated location 224 based on factors, such as those described as follows. Relocating a dataset includes copying the contents of dataset 210 from memory 216 to memory 218, and processing requests to access the dataset using memory 218 rather than memory 216. Relocating dataset 210 may cause the rate of performance degradation of memories 216 and 218 to change, because read and write operations that were directed to memory 216 would now be directed to memory 218.

Embodiments may obtain various forms of data pertaining to the operation of memories 216 and 218. This information may include various metrics that are indicative of amounts of operational degradation that have occurred on the device, a rate at which operation is degrading, and so on. For a particular memory, such as memory 216, this information may be provided at a course level of granularity. For example, memory 216 may provide metrics indicating a total rate at which the operation of memory 216 is degrading. The total rate may reflect the effect of any and all write operations performed on memory 216. Accordingly, it may not be possible to infer the effect of maintaining any particular dataset on memory 216 from metrics obtained from the drive, such as an observed rate of degrading operation 220. This may be the case, for example, when multiple datasets, such as datasets 208 and 210, are hosted on the same memory 216.

Embodiments may determine to relocate a dataset, such as dataset 210, based on various metrics collected for datasets and memories. Embodiments may determine, based, for example, on state transition metrics 200-206, that dataset 210 corresponds to the highest impact on the operational lifetime of a memory such as one of memories 216 or 218. In an embodiment, dataset 210 may be selected for relocation based on having a greatest impact on operational lifetime than at least one other dataset. Note that a dataset selected for relocation may not in all cases be the dataset whose impact on operational lifetime is the greatest. For example, some embodiments may select the dataset whose impact is second greatest.

A memory may be selected for maintaining a relocating dataset based on the selected memory having a predicted amount of remaining operational lifetime that is greater than at least one other memory in a fleet of memories used to maintain a dataset. In FIG. 2, an observed rate of degrading operation 220 may be obtained for memory 216, and an observed rate of degrading operation 222 may be obtained for memory 218. These metrics may, in some embodiments, be obtained from a memory controller or other aspect of memories 216 and 218. Based on these metrics, embodiments may estimate an amount of operational lifetime remaining for memory 216 and for memory 218. Memory 216 may be identified as having less estimated remaining lifetime than memory 218, based at least partly on having a higher observed rate of degrading operation 220.

Embodiments may select memory 218 as a target for maintaining a relocating dataset 210 based on memory 218 having a lower observed rate of degrading operation 222 than at least one of memory in a fleet of memories. Embodiments may form an estimate of remaining operational lifetime, and select memory 218 in response to determining that it has a longer estimated operational lifetime than at least one other memory in the fleet. In some cases, an estimated operational lifetime of memory 218 may be inversely proportional to an observed rate of degrading operation 222, although this may not always be the case. For example, previous intensive usage may have shortened the operational life of memory 218 even though its current observed rate of degrading operation 222 may be relatively low. Embodiments may maintain a history of metrics pertaining to the operation of the memory and use the history to form an estimate of remaining lifetime.

In an embodiment, the estimate of remaining operational lifetime may be formed through the following operations. A metric corresponding to the observed rate of degrading operation 222 may be collected. The metric may, for example, comprise a number of writes per second. An initial estimate of the remaining operational lifetime is formed by dividing a constant value by an average of the collected metric. The constant value may be derived through experimentation and may be adjusted so that the resulting estimate of remaining operational lifetime is pessimistic or optimistic, as desired. If the history of the collected metric indicates that the memory 218 was subjected to periods of greater or lesser usage, an adjusted timeframe for the average of the collected metric may be used, so that the selected timeframe excludes periods of uncharacteristically high or low usage.

Embodiments may relocate a dataset to a memory upon determining that the dataset has a higher state transition metric than at least one other dataset and a lower observed rate of degrading operation (or a greater remaining operational lifetime) than at least one other memory. For example, in FIG. 2 dataset 210 may be relocated from memory 216 to memory 218, as indicated by the arrows initial location 226 and relocated location 224.

Relocation of datasets based on the aforementioned techniques may be performed to manage equipment lifetimes in a fleet of memories. Embodiments may, for example, determine to maintain a dataset on a different memory in order to even out the projected operational lifetimes of memories in a fleet. Embodiments may also determine to maintain a dataset on a different memory in order to attempt to prolong the operational lifetime of an existing memory. This may be done in comparison to a baseline amount of operational lifetime. A baseline amount of operational lifetime may be based, for example, on a cost model of providing a hosted service. In some cases, in order to provide a hosted service, it may be necessary to achieve at least a certain average lifetime for the memories in a fleet.

Figure 3:
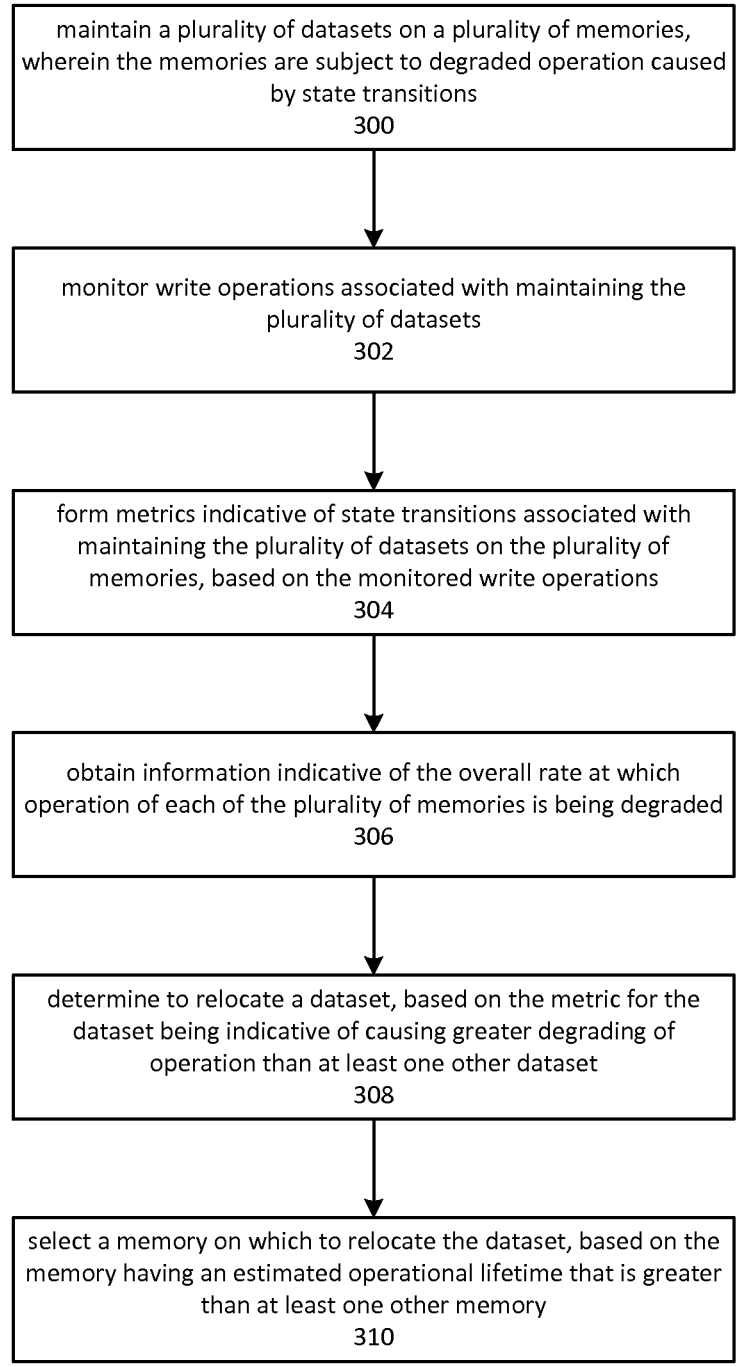
FIG. 3 is a flowchart depicting an embodiment of a process for balancing usage, in a database management system maintaining a plurality of datasets, of memories subject to operational degradation caused by state transitions.

FIG. 3 is a flowchart depicting an embodiment of a process for balancing usage, in a database management system maintaining a plurality of datasets, of memories subject to operational degradation caused by state transitions. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Operation 300 depicts maintaining a plurality of datasets on a plurality of memories, wherein the plurality of memories are subject to degraded operation caused by state transitions of memory cells in the memories. A database management system or other mechanism for managing data may utilize a fleet of memory devices, on each of which it may maintain a number of datasets. Embodiments may utilize the process depicted by FIG. 3 to influence the operational lifetime of the memories, for example by improving a chance that a memory will at least achieve a minimum amount of operational lifetime, or to improve a chance that, on average, memories in the fleet will end their operational lifetimes at approximately the same time.

As depicted by operation 302, embodiments may monitor write operations associated with maintaining the plurality of datasets. This may comprise recording information such as the number of requests to write to the memory, the size of writes, the amount of data written, whether the data was written as all ones or all zeros, entropy in the data, and so on.

Operation 304 depicts forming various metrics indicative of state transitions that are associated with maintaining the plurality of datasets on the plurality of memories. These metrics may be based on, or may comprise, information gathered by monitoring requests to write data to the memory, as depicted in operation 302. Embodiments may also apply various transformative steps to raw data collected by monitoring requests to write data to a memory. For example, an embodiment might analyze the pattern of writes to determine if a particular request to store data in memory would result in a state transition that would degrade performance. A request to store data might, depending on the memory and on the data written, only degrade operation if the data contains certain values, such as all zeros or all ones, depending on the type of memory. A similar operation may be performed for data access that involves read operations.

In various embodiments, a translation factor may be utilized to convert a raw metric, such as a number of write requests or an amount of data written, to a metric indicative of state transitions that may degrade the operation of a memory. In some cases, a translation factor may be multiplied by a recorded observation of a number of bytes written to a memory during a certain period. The result may then be normalized to obtain a per-unit-of-time metric indicative of an average number of state transitions associated with maintaining the dataset on a memory.

As depicted by operation 306, embodiments may obtain information indicative of the overall rate at which operation of each of a plurality of memories is being degraded. For an individual memory, embodiments may obtain data that indicates a rate at which operation of the memory is being degraded based on all data written to the drive. Information indicating a total amount of operational degradation may also be obtained. This information may be utilized to estimate an amount of operational lifetime remaining for each drive.

Operation 308 depicts determining to relocate a dataset to another memory, where the dataset is selected for relocation based on a metric corresponding to the dataset that is associated with a greater amount of memory wear than at least one other dataset. Embodiments may compare a dataset to others maintained on the same memory, to datasets maintained on different memories, or to both. In some cases, embodiments may determine to maintain a dataset on its current partition, based on degraded performance of a memory that might be caused by data operations associated with relocating the data.

Operation 310 depicts selecting a memory on which to relocate the dataset, based on the memory having an estimated operational lifetime that is greater than at least one other memory.

An effect of relocating a dataset, as depicted by FIG. 3, may be to cause the operational lifetimes of memories within a fleet to approximate a predicted amount of operational lifetime. Embodiments may adjust selection algorithms to accommodate various goals related to the operational lifetimes of memories.

Figure 4:
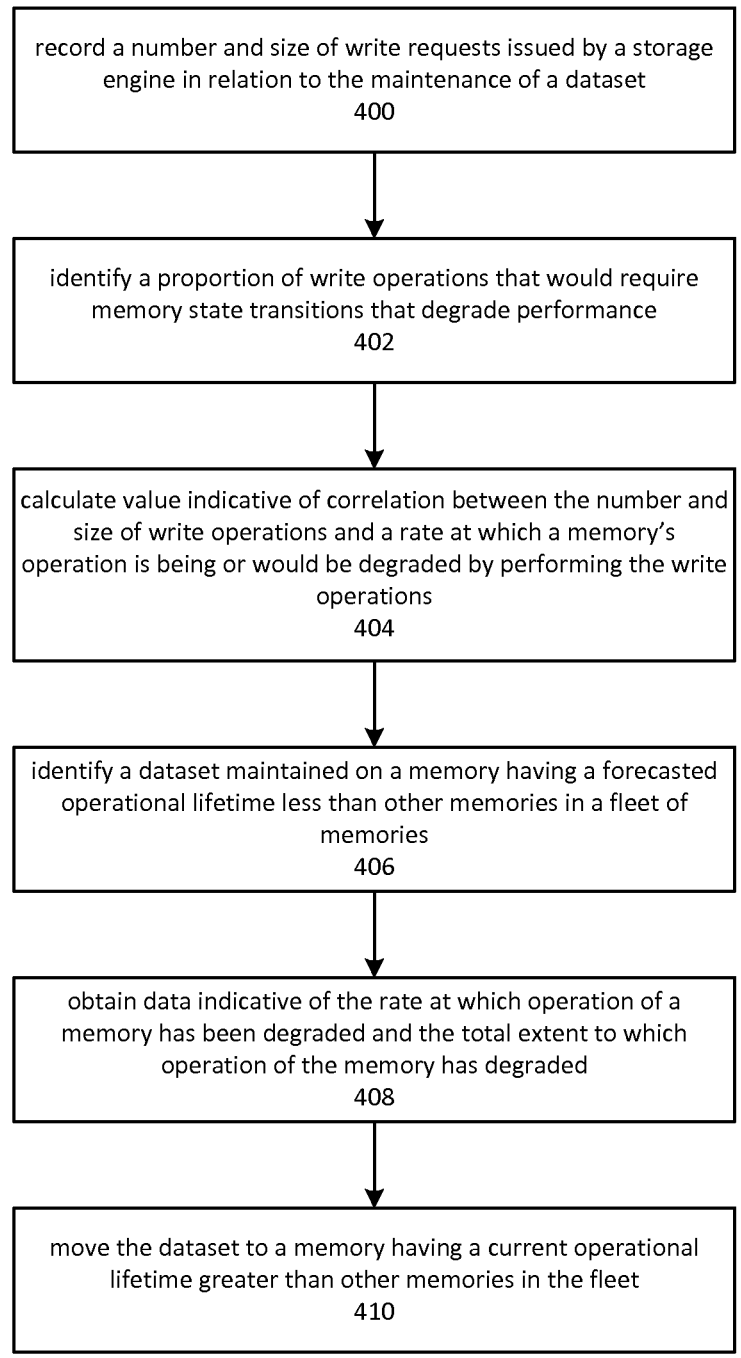
FIG. 4 is a flowchart depicting an embodiment of a process for balancing wear rates in a fleet of memories used by a database management system to maintain a plurality of datasets.

FIG. 4 is a flowchart depicting an embodiment of a process for balancing wear rates in a fleet of memories used by a database management system to maintain a plurality of datasets. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by operation 400, embodiments may record a number and size of write requests issued by a storage engine in relation to the maintenance of a dataset. Embodiments may record such data for each of a plurality of datasets.

As depicted by operation 402, embodiment may identify a proportion of write operations that would require memory state transitions that degrade performance. In some cases, this information may be identified in relation to the amount of data written. As described herein, certain data patterns may be associated with state transitions that degrade operation of a memory, while certain other data patterns may be associated with state transitions that do not degrade operation.

Embodiments may analyze write requests to determine what proportion of the written data contains patterns associated with state transitions that degrade operations of a memory. Operation 404 depicts calculating a value indicative of a correlation between the number and size of write operations and a rate at which a memory's operation is being or would be degraded by performing the write operations. The value may be calculated based on observations of a past rate of degradation of a memory, including the memory on which the dataset is being stored. The value may be used as a translation factor for converting between information indicative of a number of writes or an amount of data and an expected impact of maintaining the dataset on the operational lifetime of a memory.

Operation 406 depicts identifying a dataset that is maintained on a memory having a forecasted operational life less than other memories in the fleet. The dataset may be moved to another memory to increase the operational lifetime of the memory. Other memories in the fleet may be evaluated as candidates for hosting the relocated dataset.

As depicted by operation 408, embodiments may obtain information indicative of the rate at which operation of a memory has been degraded, the memory being a candidate for maintaining the relocated dataset. The embodiment may also obtain information indicative of the total extent to which operation memory has already been degraded. These two factors are related, in that a high rate of degraded operations correlates with the total amount of degradation. The rate at which performance of the memory has degraded may not have been linear. As a result, the relationship between the current rate and the total degradation may also not be a linear relationship. Memories in the fleet may be compared with respect to each other to determine which candidate to select for maintaining the relocated dataset. As depicted by operation 410, the dataset may be moved to a memory that has a current operational lifetime that is greater than at least some other memories in the fleet. In some cases and embodiments, the dataset may be relocated to the dataset with the greatest amount of predicted operational lifetime remaining prior to relocating the dataset. The lifetime may be an estimate based on the data obtained in operation 408.

Embodiments may utilize metrics concerning state transitions that cause wear in order to make supply chain determinations. A supply chain determination may involve procurement of types of memory suitable for use with a dataset, where suitability may refer to the rate at which the operation of the memory is predicted to degrade. An embodiment may, for example, identify a type of non-volatile memory on which to maintain a dataset, based at least in part on one or more metrics indicative of an observed or predicted rate of degraded operations. A dataset associated with a high number of state transitions that degrade operations might, for example, be maintained on a memory whose type is less subject to wear. A dataset associated with a low number of such state transitions might be maintained on a memory whose type is more prone to wear, but which may be less expensive to procure.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as SQL, while others use application programming interfaces ("APIs") containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 5:
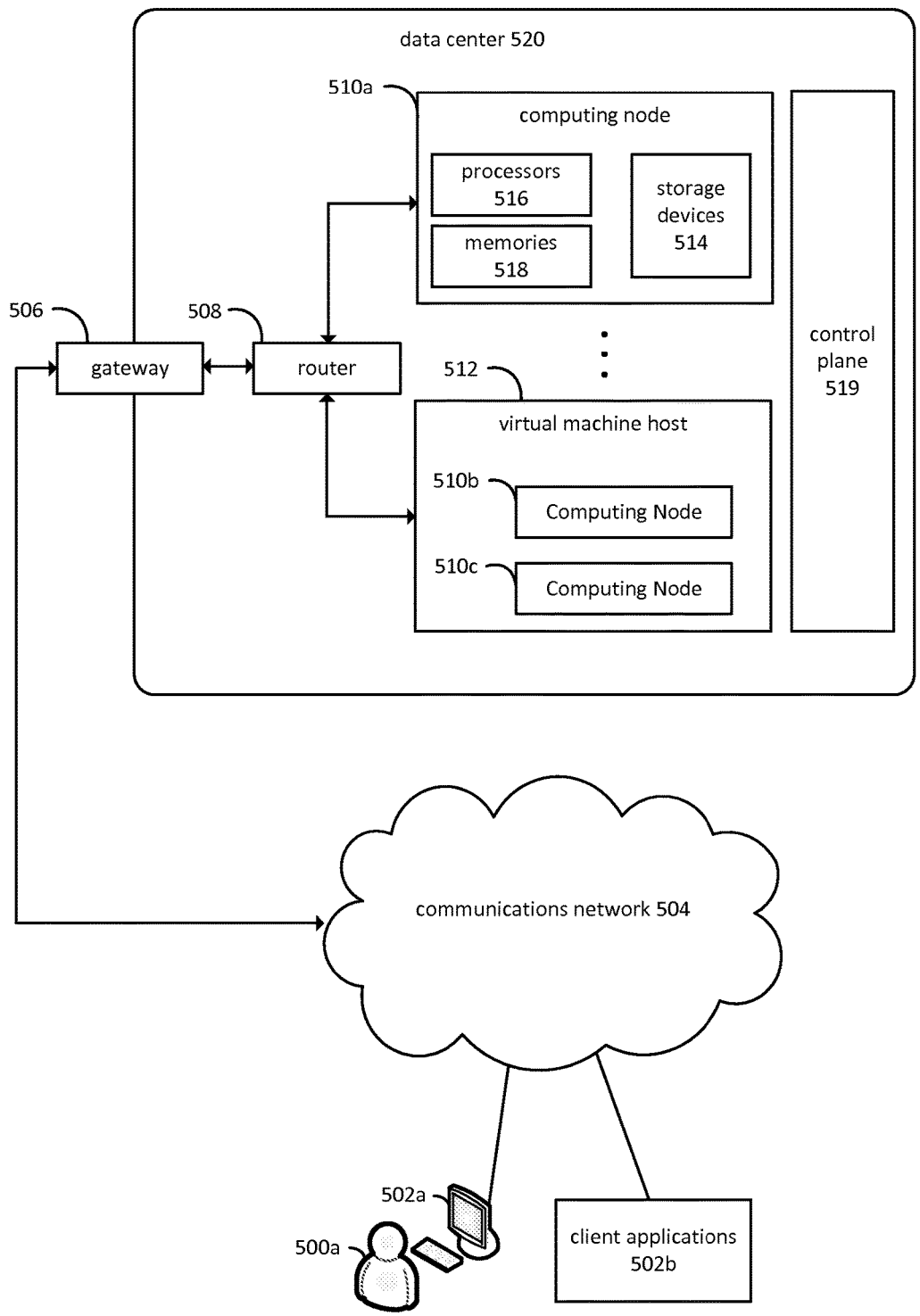
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510a, 510b, and 510c, as well as virtual machine host 512. A control plane 519 may also manage aspects of the configuration and operation of gateway 506 and router 508, as well as various other network components not explicitly depicted in FIG. 5. Embodiments may include an management interface in control plane 519 for managing control functions, such as creating new instances of a computing node, such as computing nodes 510a, 510b, or 510c, adding or configuring a virtual machine host 512, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
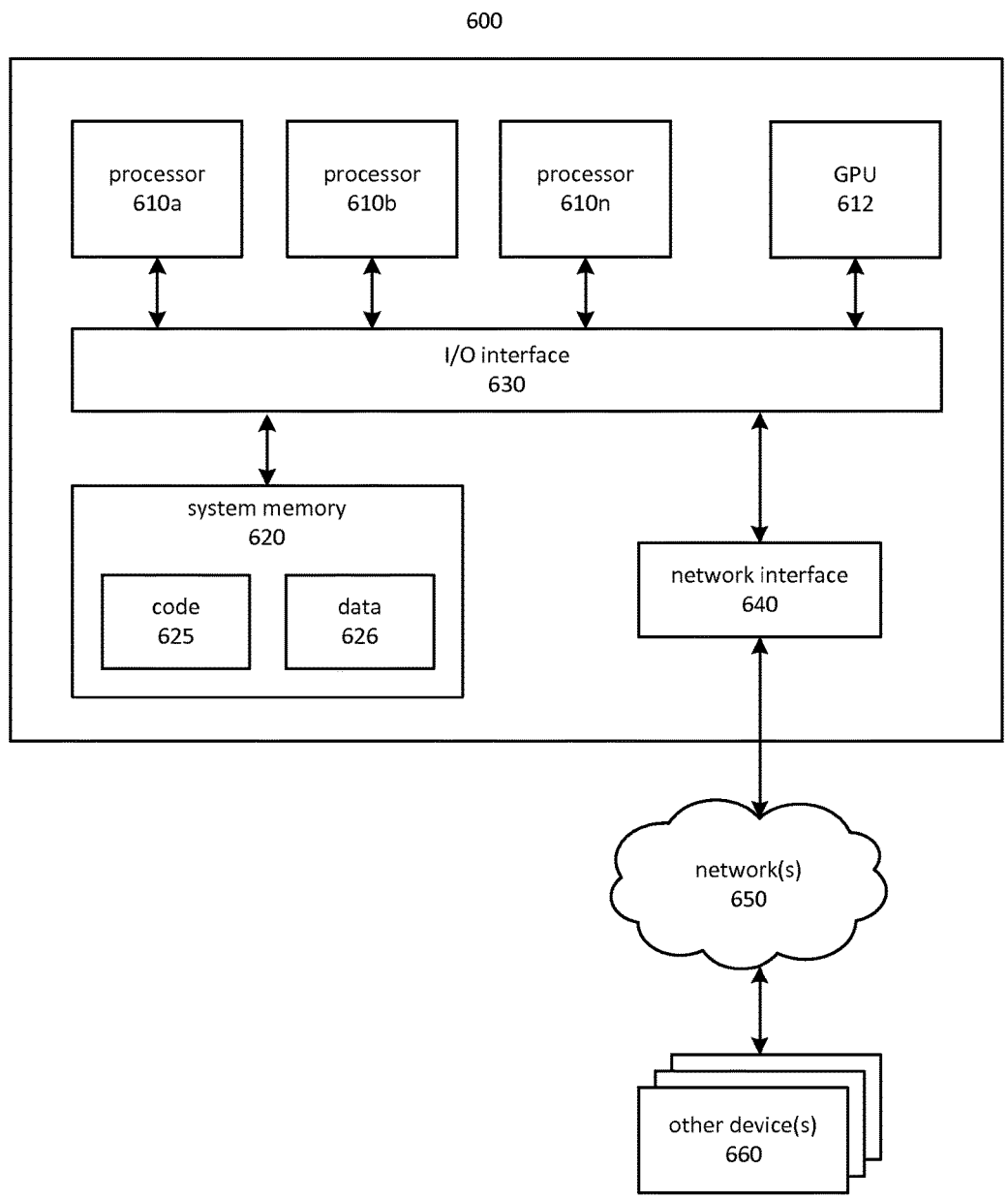
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/flash-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of network-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of central processing units ("CPUs"), the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database system, comprising:
   at least one non-transitory computer-accessible medium having stored thereon computer-readable instructions that, upon execution by a computing device, cause the system at least to:
   generate a count indicative of a number of requests to access data associated with a first dataset stored on one of a plurality of memories;
   generate a metric indicative of a number of memory state transitions that are associated with storage and retrieval operations on the first dataset and that degrade memory operation, based at least in part on the count;
   determine that storage and retrieval operations on the first dataset are associated with a greater number of memory-degrading operations than storage and retrieval operations on a second dataset, wherein a database performing the storage and retrieval operations on the first dataset causes the memory-degrading operations to be performed on one of the plurality of memories; and
   store the first dataset on a first memory, of the plurality of memories, based at least in part on the determination that the storage and retrieval operations on the first dataset are associated with the greater number of memory-degrading operations, and based at least in part on determining that the first memory has been degraded less than at least one other memory of the plurality of memories.

2. The system of claim 1, wherein the at least one non-transitory computer-accessible medium has stored thereon computer-readable instructions that, upon execution by a computing device, cause the system at least to:
   form an estimate of an operational lifetime of a second memory of the plurality of memories, wherein the first dataset is stored on the second memory; and
   determine to relocate the first dataset to the first memory, based at least in part on the estimate being less than a planned lifetime of the second memory.

3. The system of claim 1, wherein the at least one non-transitory computer-accessible medium has stored thereon computer-readable instructions that, upon execution by a computing device, cause the system at least to:
   relocate the first dataset to the first memory based at least in part on an estimate of an operational lifetime of the first memory, wherein the estimate is based at least in part on state transitions that degrade memory operation and are associated with storage and retrieval operations on the first dataset.

4. The system of claim 1, wherein determining to store the first dataset on the first memory is based at least in part on a target amount of remaining operational lifetime.

5. A method, comprising:
   generating a count indicative of a number of requests to access data associated with a first dataset stored on one of a plurality of memories;
   generating a metric indicative of state transitions that degrade memory operation, based at least in part on the count and on a value indicative of a correlation between the count and the state transitions associated with storing and retrieving data of the first dataset;
   determining that a database storing and retrieving data of the first dataset is associated with a greater number of memory-degrading operations than storing and retrieving data of a second dataset, wherein the database storing and retrieving data of the first dataset causes the memory-degrading operations to be performed on one of the plurality of memories;
   determining that operation of a first memory, of the plurality of memories, has been degraded more than at least one other memory of the plurality of memories; and
   storing the first dataset on the first memory based at least in part on the determining that storing and retrieving data of the first dataset is associated with the greater number of memory-degrading operations, and based at least in part on the determining that operation of the first memory has been degraded more than the at least one other memory.

6. The method of claim 5, further comprising:
forming an estimate of an operational lifetime of a second memory of the plurality of memories, the first dataset stored on the second memory; and
determining to relocate the first dataset to the first memory, based at least in part on the estimate being less than a planned lifetime of the second memory.

7. The method of claim 5, further comprising:
forming an estimate of an operational lifetime of a second memory of the plurality of memories.

8. The method of claim 5, wherein selecting the first memory is based at least in part on an estimate of operational lifetime of the first memory.

9. The method of claim 5, wherein the first memory is a non-volatile memory.

10. The method of claim 5, further comprising:
monitoring operations on memory performed as a result of performing storing and retrieving operations on the first dataset.

11. The method of claim 10, wherein monitoring the operations on memory performed as a result of performing storing and retrieving operations on the first dataset comprises identifying an operation on memory that corresponds to a state transition associated with degrading operation of one of the plurality of memories.

12. A non-transitory computer-readable storage medium having stored thereon instructions that, upon execution by one or more computing devices, cause the one or more computing devices at least to:
generate a count indicative of a number of requests to access data associated with first dataset stored on one of a plurality of memories;
generate a metric indicative of a number of state transitions that are associated with maintenance of the first dataset and that degrade memory operation, based at least in part on the count and on a value indicative of correlation between the count and the state transitions associated with storage and retrieval operations on the first dataset;
determine that storage and retrieval operations on the first dataset are associated with a greater number of memory-degrading operations than storage and retrieval operations on a second dataset, wherein a database performing the storage and retrieval operations on the first dataset causes the memory-degrading operations to be performed on one of the plurality of memories;
determine that operation of a first memory, of the plurality of memories, has been degraded more than at least one other memory of the plurality of memories; and
store the first dataset on the first memory based at least in part on the determining that the storage and retrieval operations on the first dataset are associated with the greater number of memory degrading operations, and based at least in part on the determining that operation of the first memory has been degraded more than the at least one other memory.

13. The non-transitory computer-readable storage medium of claim 12, comprising further instructions that, upon execution by the one or more computing devices, cause the one or more computing devices to at least:
form an estimate of an operational lifetime of a second memory of the plurality of memories, the first dataset stored on the second memory; and
determine to relocate the first dataset to another memory of the plurality of memories, based at least in part on the estimate being less than a planned lifetime of the second memory.

14. The non-transitory computer-readable storage medium of claim 12, wherein selecting the first memory is based at least in part on determining that an estimated operational lifetime of the first memory is greater than a target amount of operational lifetime.

15. The non-transitory computer-readable storage medium of claim 12, comprising further instructions that, upon execution by the one or more computing devices, cause the one or more computing devices to at least:
identify a write operation that corresponds to a state transition associated with degrading operation of one of the plurality of memories.

16. The non-transitory computer-readable storage medium of claim 12, comprising further instructions that, upon execution by the one or more computing devices, cause the one or more computing devices to at least:
move the first dataset from a second memory to the first memory, wherein the second memory has an estimated operational lifetime less than a target amount prior to moving the first dataset.

17. The non-transitory computer-readable storage medium of claim 12, comprising further instructions that, upon execution by the one or more computing devices, cause the one or more computing devices to at least:
select a type of non-volatile memory on which to store the first dataset, based at least in part on state transitions that degrade memory operation and are associated with maintenance of the first dataset.

18. The non-transitory computer-readable storage medium of claim 12, comprising further instructions that, upon execution by the one or more computing devices, cause the one or more computing devices to at least:
determine to store the first dataset on the first memory based at least in part on degraded performance caused by relocating the first dataset to a second memory.

* * * * *